J. M. FETZER.
MITERING MACHINE.
APPLICATION FILED JAN. 15, 1908.

901,699.

Patented Oct. 20, 1908.

2 SHEETS—SHEET 1.

Fig. 1.

Witnesses

Inventor
John M. Fetzer.

Attorneys

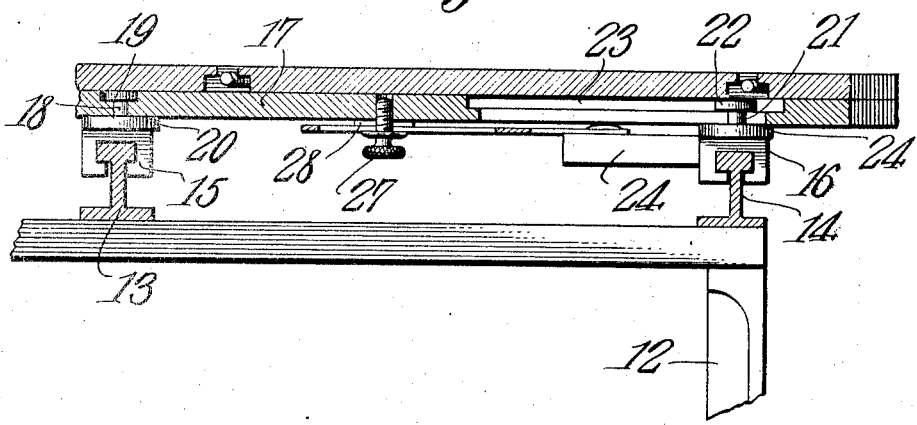
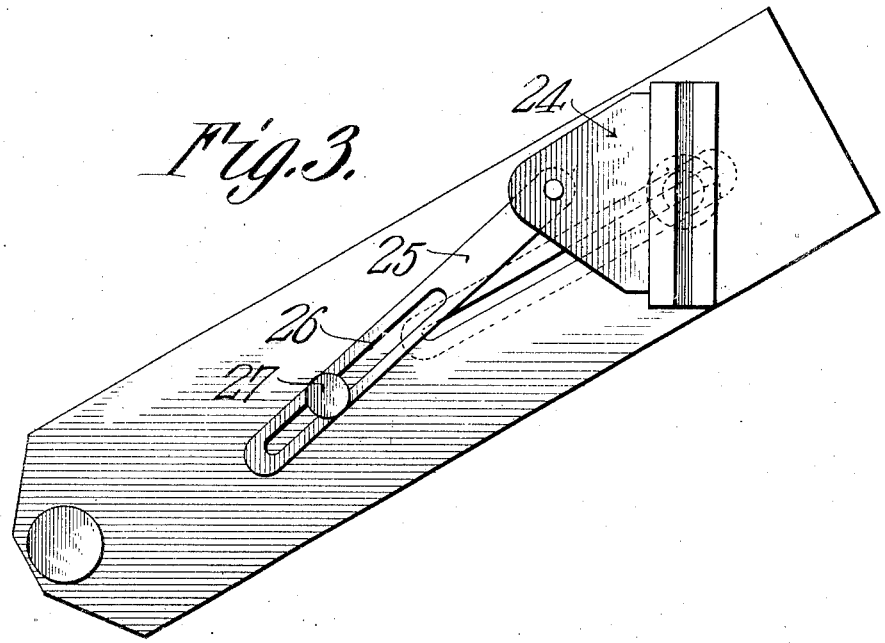

UNITED STATES PATENT OFFICE.

JOHN M. FETZER, OF MADISON, WISCONSIN.

MITERING-MACHINE.

No. 901,699.  Specification of Letters Patent.  Patented Oct. 20, 1908.

Application filed January 15, 1908. Serial No. 411,016.

*To all whom it may concern:*

Be it known that I, JOHN M. FETZER, a citizen of the United States, residing at Madison, in the county of Dane and State of Wisconsin, have invented a new and useful Mitering-Machine, of which the following is a specification.

This invention has reference to improvements in mitering machines, and more particularly with reference to machines using a circular saw as a cutting tool, which machine may be used not only for the purposes of cutting miters but by the substitution of a circular rip-saw for the circular cross-cut saw used in mitering, the machine may be adapted to operate as an ordinary circular rip saw machine.

In accordance with the present invention there is provided a saw table with a circular saw arbor arranged to be driven by power or if need be by hand, and this circular saw table is provided with adjustable guideways so that when it is desired to utilize the machine for rip sawing, then by the placing of a suitable circular rip saw on the arbor material may be ripped in the usual manner. There is also provided in conjunction with the rip saw table two tracks of unequal length, the track which is the nearer to the rip saw being shorter and these two tracks constituting a bed upon which is mounted for longitudinal movement a table having clamping means for holding the material to be cut at right angles or at any other angle and constituting the mitering table. This mitering table is adjustable to any desirable angle to the saw and is movable as a whole parallel to the saw so that material secured to the table may be presented with a saw at any desired angle. Furthermore, the mitering table is reversible so that some materials which cannot be turned over and so cut on the reverse miter may be cut by readjusting the table to be presented to the saw at opposite angles.

The invention will be best understood by a consideration of the following detail description taken in connection with the accompanying drawings forming a part of this specification, and in which drawings,—

Figure 1 is a plan view of the combined rip saw and mitering table. Fig. 2 is a cross section through the mitering table bed and also through the mitering table, and Fig. 3 is a bottom plan view of the mitering table with parts omitted.

Referring to the drawings there is shown a table 1 which constitutes the rip saw table, and this is supported upon the usual stand, not shown, since the table itself and the stand may be of the ordinary construction. This table is provided with a saw arbor 2 extending underneath the table, and on one end of the saw arbor is a pulley 3 and the other end carries a circular saw 4 which may be a cross cut saw for mitering purposes or a rip saw for ripping purposes. Fast on the table are two links 5 pivoted at one end to the table and at the other end carrying a guide strip 6 being pivoted to the latter so that the strip may be adjusted to or from the saw 4 and still maintain its parallelism thereto. In order to effect this adjustment of the strip 6 there is provided a link 7 pivoted at one end to the strip 6 and throughout the greater portion of its length provided with a longitudinal slot 8 through which there passes a stud 9 rising from the table 1 and receiving a clamp screw 10, by means of which latter the link 7 may be secured at any point of adjustment and thus, together with the links 5, will hold the strip 6 firmly in position against accidental displacement. The links 5 and 7, together with the strip 6, may be readily removed from the table so that the latter is left free and unobstructed when so desired.

Extending laterally away from the saw side of the table 1 are two supporting members 11, 11, spaced apart about the length of the table, and these members, which are mounted upon legs 12, which may be similar to the supporting legs of the saw table, serve as supports for rails 13 and 14, said rails being parallel to the saw side of the table 1. The rail 13 is near the saw while the rail 14 is removed therefrom. These rails receive undercut channel irons 15, 16, upon which are supported the miter table 17. The channel iron 15 has extending upward therefrom a pin 18 terminating in the head 19 countersunk in the table 17, and interposed between this table and the top of the channel iron 15 there is a washer 20. The other channel iron 16 is connected to the table 17 by means of a pin 21 having an expanded head 22 movable in a longitudinally-disposed undercut channel 23 formed in the bottom of the table 17, which latter may, for convenience of manufacture, be made in two parts, as indicated, or may be otherwise constructed. The table 17 is separated from the channel iron 16 by a disk 24.

The relation between the rails or tracks 13 and 14 is fixed, the rotative movement of the table 17 about the pins 18 and 21 or, considering these pins as fixed to the channel irons or carriages 15 and 16, then about the axis of these pins, must result in a change of relation between one or the other of the pins and the table. The pin 18 is in fixed relation to the table other than the relative rotative movement, while the other pin 21 is movable longitudinally with relation to the table because of the undercut slot 23. Fast on the carriage 16 is a side extension 24, and to this extension there is connected a link 25 having throughout the greater portion of its length a longitudinal slot 26, and extending through this slot is a clamp screw 27 entering a suitable nut formed in the bottom of the table 17, there being a washer 28 interposed between the link 25 and the bottom of the said table 17. By means of this link the relation of the table 17 to the carriages 15 and 16 is adjusted and thereby the angular relation of the table to the longitudinal movement thereof upon the tracks 13 and 14 is fixed. The extent of adjustment is sufficient to permit the table 17 to be set at right angles to the line of travel of the table or at the most acute angle thereto desired.

The back of the table is formed by a longitudinal flange 29 of sufficient height to act as an abutting plate for the thickest material to be used upon the device. Extending laterally through the upper portion of the table are undercut slots 30 receiving clamp blocks 31 under the control of adjusting screws 32 extending through suitable nuts in the table and terminating on the side remote from the flange 29 in hand wheels 33.

Now, assume that it is desired to cut some material square off. Then the table 17 is set by means of the clamp screw 27 and link 25 so as to be at right angles to the line of travel of the table along the tracks 13 and 14 and the material to be cut is clamped between the blocks 31 and the back plate 29 of the table. Suppose now that it is desirable to cut some material at a miter, then by means of the link 25 and the clamp screw 27 the table 17 is adjusted to the particular angle desired and there clamped. The material is secured as before on the table and presented to the saw by sliding the whole table 17 up to the saw, the angle of cut being preserved. If it is desired to cut at an opposite angle, then the table may be adjusted so as to be presented to the saw at such opposite angle. In order to bring the material close as may be to the saw that end of the table 17 adjacent to the saw is beveled, as shown at 34, on each side of a right angle portion 35.

What is claimed is:—

1. A combined rip and mitering structure composed of a rip saw table having an adjustable guide for the material to be ripped, a side extension thereof on the saw side of the table, spaced tracks mounted on said side extension and parallel with the saw side of the table, and a mitering table mounted for longitudinal movement on the tracks, said mitering table being adjustable rotatively with relation to one track and in the direction of the length of said table with relation to the other track.

2. A mitering structure comprising a circular saw arbor, spaced tracks parallel with the face of the saw carried by the arbor, and a mitering table adjustable as a whole rotatively on the track adjacent to the saw and longitudinally with relation to the track remote from the saw, said table being mounted for movement along said tracks when in any position of adjustment relative to the same.

3. A mitering structure comprising two tracks of different length the shorter of which is adjacent to a mitering saw, a carriage on each track, a mitering table supported on the carriages; pivotal connections between the carriages and the table, and means for longitudinal adjustment of one of the pivotal connections with relation to the table.

4. In a mitering structure, two parallel tracks of different length, a saw arbor for a circular saw adjacent to the shorter track, a mitering table, carriages for the same mounted on the track, pivotal connections between the carriage on the shorter track and table, a longitudinal undercut slot in the table, pivotal connections between the carriage and the longer track and the table, said pivotal connections comprising a headed pin entering the undercut slot in the table, a slotted link pivotally connected to the carriage on the long track, and a clamping means extending through the slot in the link and engaging the table and serving to secure the table in adjusted relation to the carriages and track.

In testimony that I claim the foregoing as my own, I have hereto affixed my signature in the presence of two witnesses.

JOHN M. FETZER.

Witnesses:
THOMAS REYNOLDS,
GRACE D. MEYERS.